United States Patent [19]
Masetti

[11] Patent Number: 5,828,472
[45] Date of Patent: Oct. 27, 1998

[54] PHOTONIC SWITCHING MATRIX

[75] Inventor: Francesco Masetti, Paris, France

[73] Assignee: Alcatel N.V., Rijswijk, Netherlands

[21] Appl. No.: 579,432

[22] Filed: Dec. 27, 1995

[30] Foreign Application Priority Data

Dec. 29, 1994 [FR] France .................................. 9415863

[51] Int. Cl.$^6$ .................................................. H04J 4/00
[52] U.S. Cl. ........................ 359/123; 359/140; 359/121
[58] Field of Search ..................... 359/117, 120, 359/121, 123, 135, 138, 139, 140, 119; 370/413, 414, 415, 422, 428, 429, 517

[56] References Cited

U.S. PATENT DOCUMENTS

| | | | |
|---|---|---|---|
| 4,873,681 | 10/1989 | Arthurs et al. | 359/120 |
| 5,005,167 | 4/1991 | Arthurs et al. | 357/121 |
| 5,018,130 | 5/1991 | Suzuki et al. | 359/128 |
| 5,091,905 | 2/1992 | Amada | 359/135 |
| 5,157,654 | 10/1992 | Cisneros | 370/60 |
| 5,194,977 | 3/1993 | Nishio | 359/123 |
| 5,247,514 | 9/1993 | Matsuda et al. | 370/415 |
| 5,301,055 | 4/1994 | Bagchi | 359/139 |
| 5,353,145 | 10/1994 | Le Coquil et al. | 359/139 |
| 5,475,679 | 12/1995 | Munter | 359/123 |

OTHER PUBLICATIONS

Z. Haas, "The 'Staggering Switch': An Electronically Controlled Optical Packet Switch", *Journal of Lightwave Technology*, vol. 11, No. 5/6, May 1993, New York, US, pp. 925–936, XP396722.

A. Huang, "The Relationship Between Starlite, a Wideband Digital Switch and Optics", *Conference Record, IEEE International Conference on Commmunications '86*, Jun. 22–25, 1986, vol. 3, pp. 1725–1729, Toronto, Canada.

F. Masetti et al, "Optical Fiber Buffer for High Performance Broadband Switching", *European Transactions on Telecommunications and Related Technologies*, vol. 4, No. 6, Nov. 1993, Milano Italy, pp. 671–270, XP43374.

Arthurs et al, "A Broadband Optoelectronic Packet Switching System," IEEE Jun. 1987, No. 6 pp.645–648.

*Primary Examiner*—Rafael Bacares
*Attorney, Agent, or Firm*—Sughrue, Mion, Zinn, Macpeak & Seas, PLLC

[57] ABSTRACT

A photonic switching network includes input ports and output ports; a modulation device associated with the input ports modulates cells addressed to the same output port onto an optical carrier having a wavelength assigned to that output port. Q optical paths offer respective time-delays of 0, 1, . . . , Q−1 cell times between the input ports and the output ports so that, on being routed from an input port to an output port, cells are switched to one of the paths with time-delay so as to reach the same output port one by one. It further includes a plurality of additional output ports each connected to a controllable time-delay element the output of which can be coupled to a recirculation input port.

8 Claims, 2 Drawing Sheets

PHOTONIC SWITCHING MATRIX

BACKGROUND OF THE INVENTION

1. Field of the Invention

The present invention concerns a photonic switching matrix for switching data in the form of digital optical signals constituting cells of fixed length (i.e. duration) asynchronous time-division multiplexed to form streams of cells.

2. Description of the Prior Art

The input stream of cells arriving at an input port of a switching matrix of this kind therefore comprises consecutive cells conveying call data, each made up of a certain number of characters (there is an ATM standard which adopts cells of 53 characters each of eight bits, for example). Each cell contains a routing indication that can be used to route the cell within the switching matrix to one (or more) output ports, where the cell joins an output stream of cells. Some cells in a stream of cells do not contain any call data, but only service data. These are usually called empty cells. They are easily recognizable. They do not have to be routed. Instead, these cells are inserted into an output stream of cells at an output port whenever there is no cell conveying data to be transmitted via that output port.

A matrix has a plurality of input ports and a plurality of output ports. It can happen that cells must be switched from a plurality of input ports to a single output port. Thus a plurality of cells may arrive at the same time that are addressed to the same output port. The problem of contention then arises. A known way to solve this problem is to use buffers. Buffers are provided at the input ports to store each cell until the destination output port can receive it, or at the output ports to store each cell until it can be inserted into the output stream of cells, or centrally to store the cells as and when they arrive at the input ports in order to feed them one by one to the output ports.

The invention concerns this latter type of switching matrix with a centralized buffer. An example of this type of matrix is described in document U.S. Pat. No. 5,309,266.

In this prior art matrix, cells addressed to the same output port are modulated onto an optical carrier having a wavelength associated with that output port. To route it between an input port and an output port, a cell is switched to one of Q optical paths introducing respective time-delays of 0, 1, . . . , Q–1 cell times. A cell time is the time needed to transmit a cell to an output port or the time that it occupies in the output stream of cells. These optical paths with time-delay thus constitute a buffer and supply to the same output port cells that are staggered in time. As the cells addressed to the various output ports have different carrier wavelengths, these optical paths with time-delay can be used on a pooled basis, by means of wavelength-division multiplexing, to supply cells staggered in time to all the output ports.

As described in the document mentioned above, this arrangement of the switching matrix has a structural limitation: if, as the result of a sudden influx of cells addressed to the same output port, a cell has already been placed on the path introducing a time-delay of Q–1 cell times and there is a further cell that must be routed at the same time to the output port in question, the latter cell will be lost. In terms of switching matrix performance, this imposes a limit on the average traffic permissible at each input port.

The present invention concerns provisions directed to reducing the probability of this occurring and to increasing significantly the average traffic permissible per input port of the matrix.

Document U.S. Pat. No. 4,866,701 describes a system in which some outputs of a switching matrix receive packets, equivalent to the cells mentioned above, that cannot be supplied to output ports that receive other packets at the same time, which are routed through recirculation paths and are thus fed back into inputs of the matrix with a particular fixed time-delay equal to one cell time, following which these packets are again routed by the switching matrix to their output destination. If this is again not possible, the packets in question are put back in the recirculation paths.

These provisions avoid the loss of a cell that cannot be routed by the switching matrix. They apply to a Batcher/Banyan type network the properties of and the problems arising in which are different than those of the photonic switching matrix with which the present invention is concerned.

Merely transposing a solution of this kind into the photonic matrix of the present invention merely introduces an additional time-delay per recirculation cycle. It will be shown that this does not address the problem to which the present invention is addressed.

Traffic calculations show that, if the contention problems encountered with a mean traffic of 0.5 Erlang per input port in a matrix with 16 input ports and 16 output ports, for a given loss rate, require time-delays of 0 to 15 cell times, then achieving a mean traffic of 0.8 Erlang per input port, with the same loss time, can require a time-delay of up to 50 cell times. In the teaching of the first document mentioned above, it would then be necessary to provide 50 paths with time-delay, which would be very costly and give rise to technology problems with attempting to distribute cells from the same input port to 50 paths with time-delay and with regrouping cells that have taken any of the 50 paths with time-delay in order to transmit them to the same output port. The recirculation solution described in the second document mentioned above would require 50–16=34 recirculation cycles per cell, implying a heavy recirculation cycle control overhead and a large number of recirculation paths, since each path contains only one cell in each cell time.

The present invention provides a viable solution to this problem which considerably increases the mean traffic per input port of the matrix, with the same loss rate, using only control and routing means of limited complexity and cost.

SUMMARY OF THE INVENTION

The invention consists in a photonic switching network comprising a plurality of input ports and a plurality of output ports, centralized buffers for storing cells supplied by said input ports as and when they arrive and supplying them one by one to said output ports, modulation means associated with said input ports to modulate cells addressed to the same output port onto an optical carrier having a wavelength assigned to that output port, said centralized buffers comprising Q optical paths offering respective time-delays of 0, 1, . . . , Q–1 cell times between said input ports and said output ports so that, on being routed from an input port to an output port, cells are switched to one of said paths with time-delay so as to reach the same output port one by one, and a plurality of additional output ports each connected to a controllable time-delay element the output of which can be coupled to a recirculation input port.

The invention thus allows the introduction of a controllable time-delay into each recirculation path so that any cell on a recirculation path can be delayed thereon by as many cell times as is necessary before it is presented to said recirculation port in order to be switched to the output port to which it is addressed. This represents a saving over the teaching of the second document mentioned above in that only one recirculation control function is required and in that the number of recirculation paths is very significantly reduced.

There is advantageously only one switchable time-delay element, an optical multiplexer coupling the plurality of additional output ports, which supply cells modulated onto different carriers, to an input of the time-delay element that selectively delays these cells on different carriers.

A time-delay element of this kind is described, for example, in the article "An ATM photonic switching module: dimensional and architectural analysis" by G. Bendelli et al, published in the "Proceedings of the European Conference on Optical Communications", 1994, Vol. 2, pages 821–824.

Between each additional output port and the time-delay element, a controllable wavelength converter selectively converts the wavelength of the carrier of a cell to increase by wavelength multiplexing the number of cells that can be delayed by the time-delay element.

In an embodiment, the output of the controllable time-delay element, after wavelength demultiplexing, is coupled to a plurality of additional input ports.

The output of said controllable time-delay element, after wavelength demultiplexing, is advantageously coupled to a plurality of input ports on the input side of the modulation means.

This allows cells from recirculation paths to be admitted at the normal input ports, where they take the place of empty cells. The modulation means carry out the necessary wavelength conversion.

A space switching matrix is advantageously inserted between the output of the time-delay element, after demultiplexing, and the plurality of input ports.

This allows optimum use of the empty cells included in the streams of cells from the various input ports for admission of cells from the recirculation paths.

The various objects and features of the invention will emerge more clearly from the following description of embodiments of the invention given with reference to the appended drawings.

DETAILED DESCRIPTION OF THE PREFERRED EMBODIMENTS

Figure 1:
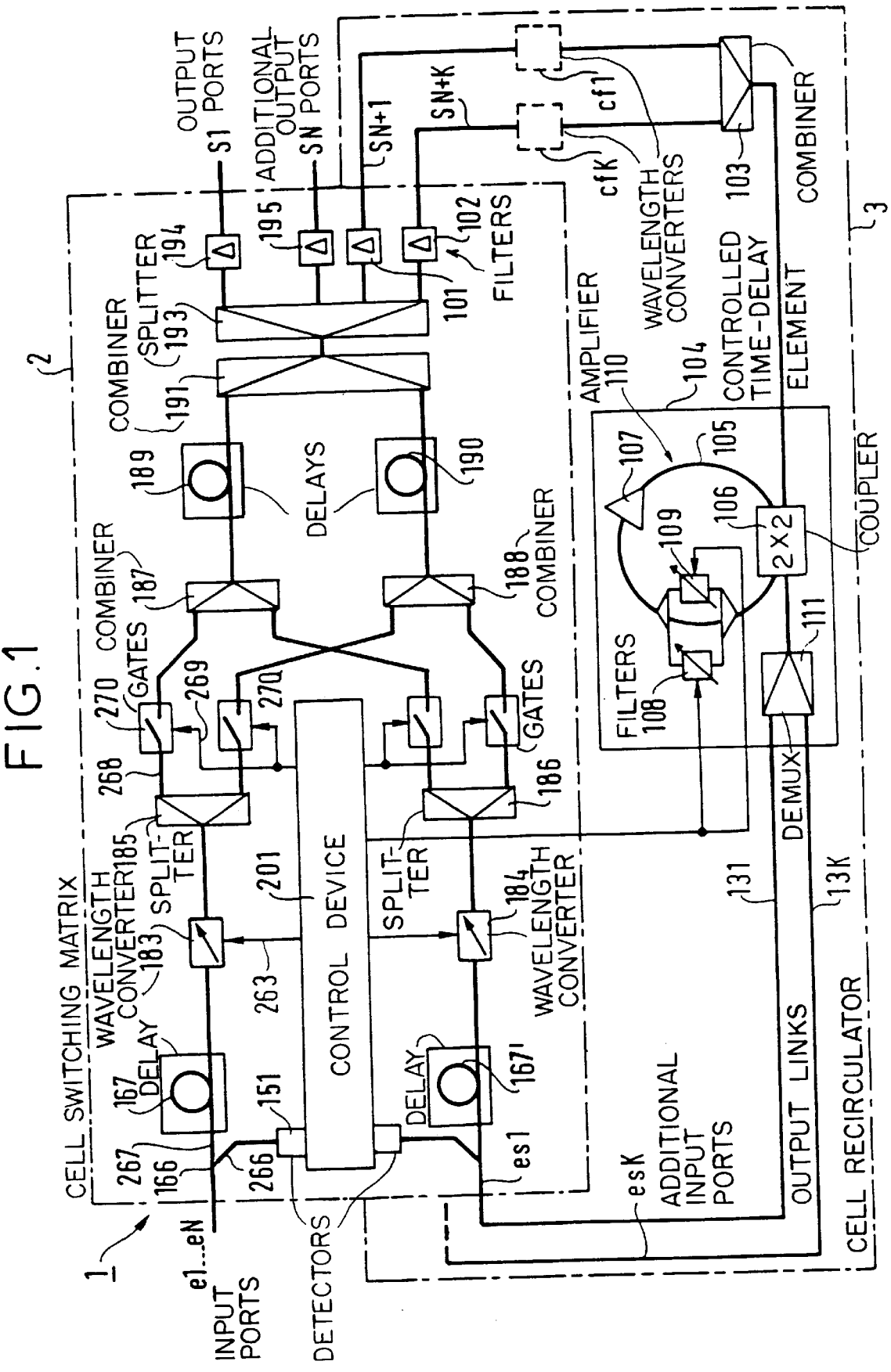
FIG. 1 shows a first embodiment of the invention in which the recirculation paths are connected to additional input ports of the switching matrix.
Figure 2:
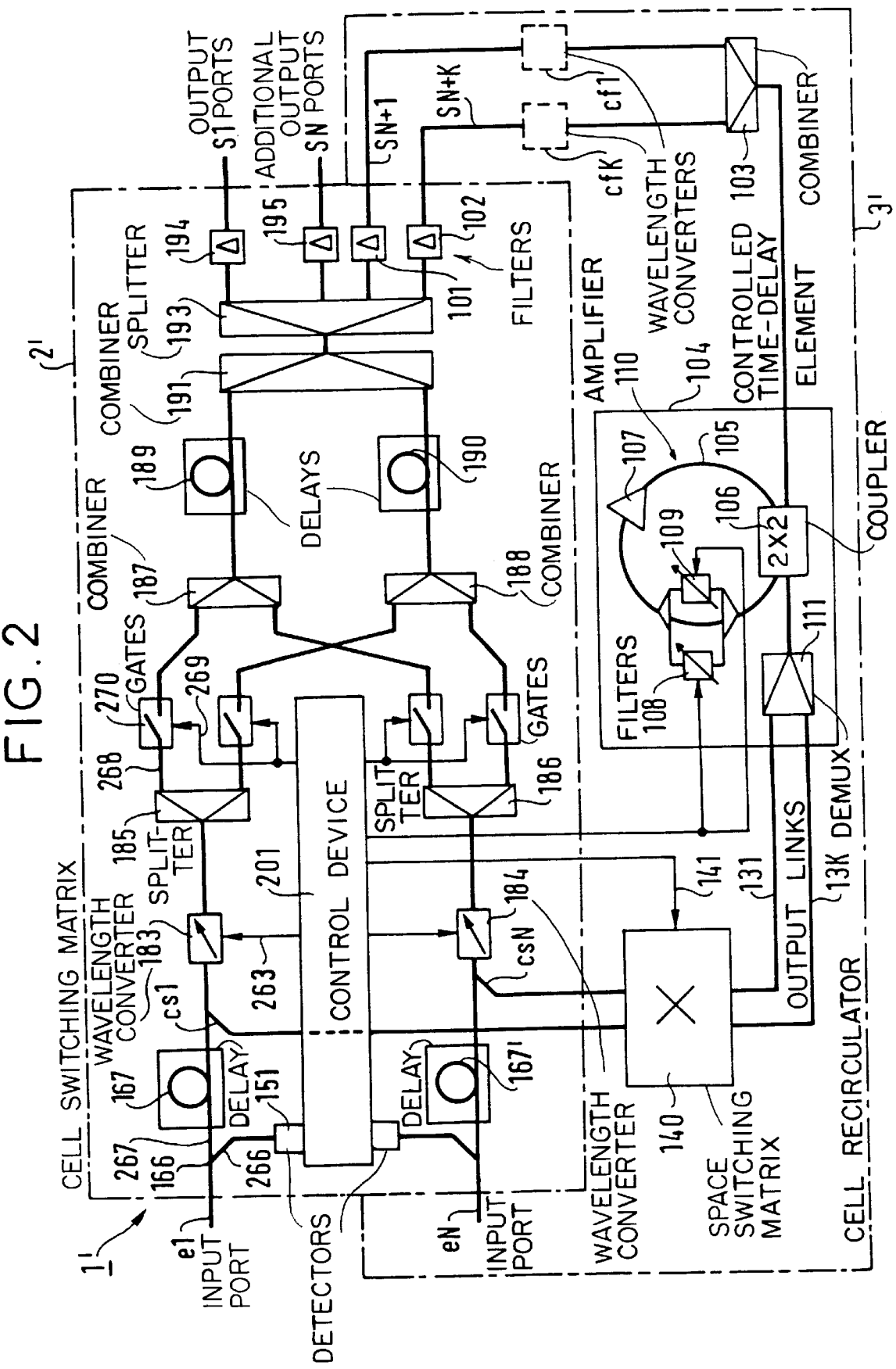
FIG. 2 shows a second embodiment of the invention in which the recirculation paths are coupled to normal input ports of the switching matrix.

FIG. 1 shows a photonic switching matrix 1 derived from that shown in FIG. 2 of the first document mentioned at the start of this text and, for easier understanding, the same reference symbols have been used wherever possible.

This photonic switching matrix 1 essentially comprises a cell switching matrix 2 and a cell recirculation device 3.

The cell switching matrix 2 comprises N optical input ports e1 through eN, only one of which is shown. These input ports carry cells of fixed length (or duration), the first characters of which constitute a header containing a routing indication. Each cell from an input port passes through an optical coupler 166, a first output 266 of which is connected to an optical detector 151 supplying to a control device 201 the data contained in the cell and in particular its header, in electrical form. Another output 267 of the coupler 166 is connected to a time-delay element 167 that can be in the form of a loop of optical fiber, the time for the cell to travel around this loop being equal to the time to transmit a cell. This time lapse gives the control device 201 the time to process the header of the cell before routing it, i.e. to prepare the various control signals that condition its routing within the switching matrix. At the end of this time lapse the cell reaches a wavelength converter 183 controlled by the control device 201 via an electrical link 263. Assuming that the cell in question is addressed to an output port S1, the wavelength converter 183 modulates a carrier of wavelength $\lambda 1$ associated with that output port S1 with the data contained in the cell. The cell then reaches an optical splitter 185 which produces the same number of copies of the cell as it has outputs. Each of these outputs is connected to an optical gate 270, . . . , 27Q controlled by the control device 201 via a link 269. Assuming that no other cell is switched at the same time to the output S1, only the gate 270 is open. The others are closed. The copy of the cell passing through the gate 270 reaches an optical combiner 187 followed by a delay line 189 introducing a virtually zero time-delay. It then reaches a combiner 191 followed by a splitter 193. This copy is then distributed to filters such as the filter 194. Only the filter 194 provides access to the output port S1.

If the cell in question is addressed to the output port SN rather than S1, the control device, aware of this from its header, sets the converter 183 to the wavelength $\lambda N$ and the filter 195 provides access to the output port SN.

Cells from other input ports are routed at the same time in the same way, provided that each is addressed to a different output port.

If the cell in question, addressed to the output port S1, is not the only cell in this situation, and if another cell, taking the advantage, is routed directly, as just described, to the output port S1, instead of opening the gate 270 the control device opens a similar optical gate (not shown) leading to a delay line (also not shown) similar to the delay line 189. This delay line introduces a time-delay equal to one cell time (the time to transmit a cell to the output ports). This cell therefore reaches the combiner 191 and the output port S1 one cell time later, to be transmitted after that which took the advantage over it.

If the cell in question, addressed to the output port S1, is accompanied by two other cells that have a higher priority, the cell is switched via another gate (not shown) and another delay line, the time-delay of which is equal to two cells times, so that it arrives at the output port S1 only after the first two, and so on pro rata for other cells to be switched simultaneously to the output port S1.

In the cell time following that just considered, a cell addressed to the output port S1 is also routed to the delay line introducing a time-delay of two cell times, since the latter is not empty, in order to preserve the chronological order of the cells passing through the switching matrix.

In the next cell time another cell also addressed to the output port S1 would have to be switched to a delay line with a time-delay of three cell times, and so on.

If the output port S1 is addressed repetitively, the incoming cells are progressively routed by delay lines with time-delays corresponding to increasing numbers of cell times, up to the last delay line 190 shown in the figure.

Everything just stated in connection with cells addressed to the output port S1 applies to the other output ports. Only the wavelength changes. The delay lines, combiners and splitters are not wavelength-sensitive and operate on all wavelengths by spectral multiplexing.

However, if cells addressed to the output port S1 accumulate in the buffer memory, there is a low probability that such accumulation will occur at the same time for another output port, and the probability that this will occur for further output ports decreases very quickly as the number of output ports in question increases.

All the above is described in the first document mentioned above, to which the reader is referred for more details.

The invention concerns provisions additional to those described so far and which are addressed to the problem now to be explained.

As a result of an influx of cells all addressed to the output port S1, a cell is routed via the delay line 190, as already explained. If there is another cell addressed to the same output port S1 at the same time, according to the above prior art document there is no longer a solution to the problem; the latter cell is lost.

To avoid this, the invention provides additional output ports SN+1 through SN+K and a recirculation device described below, after the following explanation of how a excess cell such as that just mentioned is routed.

Carrier wavelengths λN+1 through λN+K are associated with these output ports. If the process as described above fails, routing to these additional outputs is effected by means of a change of destination carried out in the control device 201, which knows how full the various queues are, and the output ports SN+1 through SN+K are used one after the other on an as needed basis.

The recirculation device 3 is coupled to the output ports SN+1 through SN+K and comprises an optical combiner reuniting the cells at different carrier wavelengths from these additional output ports for onward transmission to a controllable time-delay element 104 which retains these cells for the necessary time, under the control of the control device 201. At the appropriate time, under the control of the control device, the time-delay element 104 supplies these cells to the output links 131 through 13K. These are connected to additional input ports es1 through esK of the switching matrix 2 which are treated as normal ports. The cells supplied to these input ports are those previously received at normal ports. They differ from the latter only in respect of the carrier wavelength, but the wavelength of any cell supplied to an additional input port is that which was associated with the additional output port from which the cell was transferred to the recirculation device. It is therefore known. The additional input ports are thus processed in exactly the same way as normal input ports. The control device 201 nevertheless gives priority to cells which reach the switching matrix via the additional input ports over cells which reach it via the normal input ports. The former will therefore be routed after cells preceding them routed normally as described previously. The latter, which do not have priority, are therefore recirculated and thus routed after the former. This is necessary to preserve the chronological order of the cells from the same input port to the same output port.

Globally, the control device therefore switches a first cell that cannot be routed directly to the output port to which it is addressed to an additional output port. It can do this with a time-delay of Q−1 cell times so that, to preserve the chronological order of the cells addressed to the same output, it is sufficient for the recirculation device to delay it by one cell time only. This cell will occupy one of the additional output ports. Other cells addressed to the same output and present simultaneously will occupy other additional output ports. They must be subjected to a progressively increasing time-delay to enable them to be re-introduced one by one, without risk of overloading the buffer of the cell switching device. Other cells for the same destination follow on and are similarly held in the recirculation device.

The same process may be applied in the same period with respect to cells addressed to another output port or to other output ports requiring further additional output ports and additional optical wavelengths for storing cells in the time-delay element. The number of these wavelengths needed for recirculation being greater than the number of additional output ports needed, additional wavelengths must be made available. How this is achieved is described at the end of this text.

The foregoing description is naturally given by way of example only, and it is clear that more complex processes can be implemented, by altering the time-delays that can be introduced conjointly by the buffer of the cell switching matrix and that of the recirculation device.

The embodiment of the time-delay, element 104 shown in FIG. 1 comprises a 2×2 coupler 106, a battery of controlled optical filters, such as the filters 108 and 109, and an optical amplifier 107 disposed in a looped optical fiber 110. The output of the wavelength multiplexer 103 is connected to an input port of the 2×2 coupler. The output of the optical amplifier 107 is connected to the other input port of this coupler. One of the two outputs of this coupler is connected to the battery of filters. Its other output is connected to an optical demultiplexer 111 connected to the output ports of the time-delay element 104.

A device of this kind is described in the article by Bendelli et al mentioned above. By operation on each of the filters, the control device 201 eliminates a cell of corresponding wavelength circulating in the optical fiber loop, acquiring a time-delay of one cell time for each complete circuit of the loop. At the same time, by operating on the frequency converter at the input port receiving this cell, the control device causes it to be routed by the switching matrix to the output to which it is addressed.

FIG. 2 shows a second embodiment of the invention. The cell switching matrix 2' is similar to the cell switching matrix 2 in FIG. 1, except that the additional inputs es1 through esK are no longer present, the normal inputs e1 and eN both being shown, and it additionally includes a recirculation coupler cs1 through csN. In the absence of recirculation these couplers are inactive. All the other components of the cell switching matrix in FIG. 2 are identical and fulfil the same role as the corresponding elements of the cell switching matrix in FIG. 1 and for this reason are identified by the same reference symbol. In the absence of recirculation the matrix operates in exactly the same way as described with reference to FIG. 1. This description will therefore not be repeated. The sending of excess cells to the recirculation paths is also effected in the same way as previously.

The recirculation device 3' is similar to the recirculation device 3 in FIG. 1 and, once again, the same components have the same functions and are identified by the same reference symbols, except that there is an additional space switching matrix 140 controlled directly by the control device 201 over a multiple link 141. Under the control of the control device 201, this matrix can at any time connect any of the K output ports 131 through 13K of the time-delay element 104 to any of the N input ports of the cell switching matrix 2', via the recirculation couplers already mentioned.

The operation of the FIG. 2 switching matrix differs from that of FIG. 1 in that the cells held in the time-delay element 104 and released under the control of the control device 201 are each inserted into any one of the input streams of cells, in place of an empty cell, when the control device 201 detects one. At this time, the wavelength converter 183, 184 receives a command enabling conversion between the wavelength of the recirculation cell, λN+1 through λN+K, and the wavelength associated with the output concerned. The result is the same as with the FIG. 1 switching matrix, in terms of cell routing performance and possibilities, to the extent that, in practise, the throughput of empty cells is sufficient for requirements, as shown by traffic calculations. Additional inputs are saved, which relaxes the technology constraints relative to the optical couplers 187, 188, at the maximum cost of an additional space switching matrix 140.

In another embodiment the K output ports of the recirculation device could simply be connected to K of the N input ports of the cell switching matrix.

Note that in either case it is possible for cells addressed to different output ports to be transmitted simultaneously if the input traffic comprises sufficient empty cells.

In both embodiments shown, there are additional wavelength converters cf1 through cfK between the additional output ports sN+1 through sN+K and the optical combiner 103 (they can be in the cell switching matrix 2, 2' or in the recirculation device 3, 3') under the direct control of the control device 201, via control links that are not shown. On each recirculation path they increase the number of wavelengths available in order to increase the number of cells that can be accepted by the recirculation device. Thus for the output SN+1 (wavelength λN+1), the converter cf1 selectively changes the wavelength λN+1 to λN+1, λN+1+K, λN+1+2K, ..., λN+1+MK. Likewise for the other ports, for which the number of cells that can be stored in the time-delay element 104 is multiplied by M+1. Symmetrical converters could be provided at the output ports of the time-delay element 104 or, more simply, the converters 183, 184 could assume this function.

It is obvious that the foregoing description has been given by way of non-limiting example only and that numerical values in particular can be changed to suit each individual application.

There is claimed:

1. Photonic switching network comprising a plurality of input ports and a plurality of output ports, centralized buffers for storing cells supplied by said input ports as and when they arrive and supplying them one by one to said output ports, modulation means associated with said input ports to modulate cells addressed to the same output port onto an optical carrier having a wavelength assigned to that output port, said centralized buffers comprising Q optical paths offering respective time-delays of 0, 1, ..., Q-1 cell times between said input ports and said output ports so that, on being routed from an input port to an output port, cells are switched to one of said paths with time-delay so as to reach the same output port one by one, and a plurality of additional output ports each connected to a controllable time-delay element the output of which can be coupled to a recirculation input port.

2. Photonic switching network according to claim 1 wherein there is only one switchable time-delay element, an optical multiplexer coupling said plurality of additional output ports, which supply cells modulated onto different carriers, to an input of said time-delay element that selectively delays these cells on different carriers.

3. Photonic switching network according to claim 1 wherein, between each additional output port and said time-delay element, a controllable wavelength converter selectively converts the wavelength of the carrier of a cell to increase by wavelength multiplexing the number of cells that can be delayed by said time-delay element.

4. Photonic switching network according to claim 1 wherein the output of said controllable time-delay element, after wavelength demultiplexing, is coupled to a plurality of additional input ports.

5. Photonic switching network according to claim 1 wherein the output of said controllable time-delay element, after wavelength demultiplexing, is coupled to a plurality of input ports on the input side of said modulation means.

6. Photonic switching network according to claim 5 wherein a space switching matrix is inserted between the output of said time-delay element, after demultiplexing, and said plurality of input ports.

7. A photonic switching network comprising a plurality of input ports and a plurality of output ports, centralized buffers for storing cells supplied by said input ports as and when they arrive and supplying them one by one to said output ports, modulation means associated with said input ports to modulate cells addressed to the same output port onto an optical carrier having a wavelength assigned to that output port, said centralized buffers comprising Q optical paths offering respective time-delays of 0, 1, ..., Q-1 cell times between said input ports and said output ports so that, on being routed from an input port to an output port, cells are switched to one of said paths with time-delay so as to reach the same output port one by one, and at least one additional output port connected to a controllable time-delay element the output of which can be coupled to at least one recirculation input port, whereby cells coupled to said additional output port are recirculated to said recirculation input port.

8. A photonic switching network according to claim 7 wherein there are a plurality of said additional output ports and a plurality of said recirculation input ports.

* * * * *